United States Patent
Leirer et al.

(10) Patent No.: US 10,124,421 B2
(45) Date of Patent: Nov. 13, 2018

(54) END MILLING CUTTER FOR HEAT-RESISTANT SUPERALLOYS

(71) Applicant: Walter AG, Tübingen (DE)

(72) Inventors: Philipp Leirer, Offenburg (DE); Hans-Peter Hippler, Gutach (DE); Thomas Schaarschmidt, Mötzingen (DE)

(73) Assignee: Walter AG, Tübingen (DE)

( * ) Notice: Subject to any disclaimer, the term of this patent is extended or adjusted under 35 U.S.C. 154(b) by 150 days.

(21) Appl. No.: 15/022,076

(22) PCT Filed: Aug. 21, 2014

(86) PCT No.: PCT/EP2014/067833
§ 371 (c)(1),
(2) Date: Mar. 15, 2016

(87) PCT Pub. No.: WO2015/058881
PCT Pub. Date: Apr. 30, 2015

(65) Prior Publication Data
US 2016/0228955 A1 Aug. 11, 2016

(30) Foreign Application Priority Data
Oct. 21, 2013 (DE) .......................... 10 2013 111 596

(51) Int. Cl.
*B23C 5/10* (2006.01)
*B23C 5/28* (2006.01)

(52) U.S. Cl.
CPC .................. *B23C 5/10* (2013.01); *B23C 5/28* (2013.01); *B23C 2210/02* (2013.01);
(Continued)

(58) Field of Classification Search
CPC ............. B23B 2240/08; B23B 2240/11; B23B 2240/16; B23B 31/11; B23B 31/1107;
(Continued)

(56) References Cited

U.S. PATENT DOCUMENTS 3,080,777 A * 3/1963 Lovret .................. B23C 5/1009
408/199
4,762,445 A * 8/1988 Bunting .................. B23B 51/02
408/144

(Continued)

FOREIGN PATENT DOCUMENTS

DE 10205635 A1 8/2003
DE 102011121767 A1 7/2012
(Continued)

OTHER PUBLICATIONS

Anwenderhandbuch der Firma Sandvik Coromant: Hochwarmfeste Superlegierungen, 2010, pp. 64, 82, and 97.
(Continued)

*Primary Examiner* — Nicole N Ramos
(74) *Attorney, Agent, or Firm* — Morgan, Lewis & Bockius LLP

(57) ABSTRACT

An end milling cutter for heat-resistant superalloys (HRSA) has a shank and a cutting head, which have a common rotation axis, the shank having a connection section for connection to the cutting head and a coupling section for connection to a tool holder, the cutting head consisting of a solid ceramic part, which has a rotationally symmetrical envelope and is butt-joined to an end face of the connection section. In order to keep excessive vibrations and thus stresses low in the interface between the cutting head and the connection section of the milling cutter and to create milling cutters that can also cover the diameter range above 12 mm
(Continued)

and in particular above 20 mm and up to 32 mm, the coupling section has a conical peg having an external thread.

17 Claims, 2 Drawing Sheets

(52) U.S. Cl.
CPC ...... *B23C 2210/03* (2013.01); *B23C 2226/18* (2013.01); *B23C 2240/08* (2013.01); *B23C 2240/21* (2013.01); *B23C 2240/32* (2013.01); *B23C 2265/08* (2013.01)

(58) Field of Classification Search
CPC . B23B 31/1115; B23B 31/1122; B23D 77/00; B23D 2277/02; B23D 2277/061; Y10T 408/909; Y10T 408/9095; Y10T 408/9097; Y10T 408/78; Y10T 408/9098; Y10T 408/90993; Y10T 408/94; Y10T 408/95; Y10T 408/957; Y10T 407/1946; Y10T 407/1948
See application file for complete search history.

(56) References Cited

U.S. PATENT DOCUMENTS

| | | | | |
|---|---|---|---|---|
| 5,486,072 | A * | 1/1996 | Green | B23C 5/10 407/118 |
| 5,979,912 | A * | 11/1999 | Cook | B23B 31/005 279/102 |
| 6,132,148 | A * | 10/2000 | Thompson | B23B 51/02 408/144 |
| 6,394,711 | B1 * | 5/2002 | Brosius | B23C 5/10 279/8 |
| 6,742,968 | B1 * | 6/2004 | Volokh | B23C 5/10 407/34 |
| 7,713,004 | B2 * | 5/2010 | Lehto | B23B 31/005 407/30 |
| 8,647,025 | B2 | 2/2014 | Davis et al. | |
| 9,266,173 | B2 | 2/2016 | Ben Amor | |
| 9,802,260 | B2 * | 10/2017 | Zimmerman | B23D 77/02 |
| 2005/0271890 | A1 * | 12/2005 | Koecher | B23B 51/02 428/615 |
| 2006/0072977 | A1 * | 4/2006 | Jonsson | B23B 31/1107 408/233 |
| 2006/0254553 | A1 * | 11/2006 | Stark | F01L 3/02 123/188.1 |
| 2006/0257215 | A1 * | 11/2006 | Kakai | B23B 31/11 407/101 |
| 2007/0248421 | A1 * | 10/2007 | Kakai | B23B 31/1107 407/34 |
| 2011/0123280 | A1 * | 5/2011 | Hobohm | B23C 5/1081 407/34 |
| 2012/0183363 | A1 * | 7/2012 | Davis | B23C 5/10 407/54 |
| 2013/0028669 | A1 * | 1/2013 | Cigni | B23C 5/10 407/11 |
| 2013/0047397 | A1 * | 2/2013 | Jonker | B22F 7/06 29/419.1 |
| 2014/0119844 | A1 * | 5/2014 | Osawa | B23C 5/10 407/54 |
| 2015/0063928 | A1 | 3/2015 | Maeda et al. | |

FOREIGN PATENT DOCUMENTS

| | | | | |
|---|---|---|---|---|
| DE | 102012202976 | A1 | 8/2012 | |
| DE | 202013003224 | U1 | 6/2013 | |
| EP | 1847345 | A2 | 10/2007 | |
| EP | 1847345 | B1 | 10/2007 | |
| EP | 2650069 | A2 | 10/2013 | |
| JP | WO 2013005307 | A1 * | 1/2013 | ............ B23C 5/10 |
| WO | 2006/121477 | A2 | 11/2006 | |
| WO | 2008/150219 | A1 | 12/2008 | |
| WO | 2013/146882 | A1 | 12/2015 | |

OTHER PUBLICATIONS

International Search Report and Written Opinion dated Nov. 24, 2014 for International Application No. PCT/EP2014/067833.
German Search Report in 10 2013 111 596.9 dated Jun. 5, 2014.
International Preliminary Report on Patentability dated Apr. 26, 2016, for International Application No. PCT/EP2014/067833.

* cited by examiner

END MILLING CUTTER FOR HEAT-RESISTANT SUPERALLOYS

The present application is a U.S. National Phase Application of International Application No. PCT/EP2014/067833, filed 21 Aug. 2014, which claims priority to German Application No. 10 2013 111 596.9, filed 21 Oct. 2013.

The present invention concerns an end milling cutter for heat-resistant superalloys (HRSA) comprising a shank and a cutting head, which have a common axis of rotation, wherein the shank has a connecting portion for connection to the cutting head and a coupling portion for connection to a tool holder, wherein the cutting head comprises a solid ceramic part having a rotationally symmetrical envelope, which part is butt-connected to the end face of the connecting portion.

The butt connection is effected in the state of the art by means of hard solder.

End milling cutters with cutting elements of ceramic are predominantly used for so-called heat-resistant superalloys (HRSA), for example for nickel-based alloys which are used for turbine blades and other components in gas turbines at temperatures of up to for example 1450° C. Such alloys have on the one hand a very high level of heat resistance but at the same time also a low level of thermal conductivity so that in the machining operation correspondingly high temperatures occur on the cutting surface of the tool.

Conventional coated carbide metal tools soften and wear very quickly at the high temperatures which occur during the machining operation.

Ceramic cutting materials for their part however have an extremely high heat resistance and can therefore be used at high machining temperatures. Because the thermal conductivity of the ceramic is also relatively low, which once again contributes to higher machining temperatures, the situation rather involves softening of the work material before the ceramic cutting material softens and the material as a result can be more easily cut.

Essentially two types of end milling cutters which use ceramic cutting elements are known in the state of the art. On the one hand there are end milling cutters having receiving means or pockets for cutting inserts, in which cutting inserts of ceramic are fixed. As however corresponding cutting inserts must also be of a certain minimum size to provide adequate stability such end milling cutters are only available for diameters beyond 32 mm.

In addition there are also end milling cutters of the kind described in the opening part of this specification, comprising a cylindrical shank having a cutting head which includes all of the front portion of the end milling cutter, that is provided with cutting edges, and completely consists of ceramic. Such a cutting head is usually soldered to the shank. End milling cutters completely consisting of ceramic are also already known.

End milling cutters of that kind comprising full ceramic or with a fully ceramic cutting head are however available in the best-case scenario for a diameter of up to a maximum of 20 mm, in which respect diameter dimensions for end milling cutters in this description and the claims refer in each case to the cutting head or the part provided with cutting edges, and wherein in the case of cutting edges which are not arranged diametrally, the diameter is to be defined as double the radius from the axis of rotation of the milling cutter to the cutting edge involving the maximum radius.

In the case of the end milling cutters with fully ceramic cutting head the connection between the cutting head and the shank is relatively critical as those parts are generally only soldered to each other in a butt join and do not have a positively locking connection. Besides the manufacturing costs for cutting heads of solid ceramic the limited strength of such a solder connection is one of the reasons why corresponding end milling cutters could hitherto not be provided of larger diameter. That is also related to the high cutting forces which occur when using such milling cutters as they are generally employed for coarse roughing machining operations in which relatively large volumes of the workpiece have to be machined.

In particular grooves and radii on turbine blades frequently require milling cutters involving an effective tool diameter below 32 mm.

It will be noted however that considerable forces occur in the roughing machining of heat-resistant superalloys so that, particularly with the typical advance feed movement of milling cutters perpendicularly to the axis of rotation the solder connection between a cutting head and the connecting portion of a shank is subjected to heavy loadings, in which respect heavy loadings in conjunction with a simple clamping mounting of a cylindrical tool shank in a machine tool spindle can also very quickly lead to severe vibration of the end milling cutter.

Many milling cutters are therefore provided with a shank which is of a larger dimension in comparison with the cutting head, which however frequently limits the effective working diameter of the corresponding milling cutter to below 12 mm.

To keep down excessive vibration and thus loadings on the interface between the cutting head and the connecting portion of the milling cutter therefore the shank or the coupling portion of the shank of a corresponding milling cutter should be held as precisely as possible and in as play-free and vibration-free manner in the tool mounting of a corresponding machine tool. In addition there is a need for corresponding milling cutters which can also cover the diameter range above 12 mm and in particular above 20 mm and up to 32 mm.

The above-mentioned problems are at least partially resolved by an end milling cutter according to the present invention in that the coupling portion of the shank has a conical peg with a male thread.

Corresponding conical couplings have proven to be sufficiently robust and precise to so greatly reduce for example vibration loadings that the solder join between the cutting head and the connecting portion of the shank withstands the forces occurring in roughing machining operations of heat-resistant superalloys, even if the cutting head is of an effective diameter of up to 32 mm. A further advantage of such a coupling portion is that numerous variants of mounting shanks are available for same, with which it is possible to implement inter alia different cantilever lengths.

The stability and running smoothness of the milling cutter for reducing the loading on the interface between the cutting head and the connecting portion can be still further improved if the transition from the coupling portion to the shank is formed by a contact surface which is perpendicular to the axis of rotation and which is adapted for support against a corresponding abutment surface of a tool mounting.

In addition the combination of the materials ceramic for the cutting head and carbide metal or steel for the shank also per se already has a vibration-reducing effect, which besides the increase in machining quality also contributes to prolonging the service life.

In addition, for the same purpose and for further increasing the running smoothness and freedom from vibration the coupling portion between the above-mentioned contact surface and the thread on the cylindrical peg can have a guide portion which is rotationally symmetrical, that is to say for example either a cylindrical guide portion or also a slightly conical guide portion, the minimum radius of which is greater than the maximum radius of the conical peg.

It will be appreciated that there should then be provided at the corresponding tool mounting a corresponding rotationally symmetrical cylindrical or conical mounting surface against which the guide portion bears in a close fit, possibly also as an interference fit, if the contact surface reaches a corresponding abutment surface on the tool mounting.

The conical thread is preferably either of a part-cylindrical or however a trapezoidal cross-section, in which case the trapezoidal shape can also be an asymmetrical trapezoidal shape.

In addition, for reducing the loading on the interface between the cutting head and the connecting portion of the shank, it has proven to be advantageous if the ratio of the axial length of the cutting head to its diameter is less than 1, in particular less than 0.6 or indeed less than 0.5. In that way the ratio of the length of the cutting edge components which extend parallel to the axis of rotation and perpendicularly to the advance feed direction is reduced to the size of the connecting surface so that the corresponding forces can also be better carried. In particular the effective lever for cutting forces which act on a cutting corner as far as the solder join between the cutting head and the connecting portion is correspondingly smaller than in the case of cutting heads which have a larger ratio of axial length to diameter.

The chip flutes ground into the cutting head are desirably extended into the shank or into the connecting portion. That ensures that chip transport in the axial direction is not impeded or adversely affected.

The shank can also have bores and/or openings for a coolant to pass therethrough. Suitable internal cooling by way of a central or a plurality of entirely or partially decentral bores is particularly desirable in connection with the above-described variant in which the flutes extend into the connecting portion of the shank. Corresponding coolant bores can then open from the inwardly disposed bores in the portion of the flutes, that extends into the connecting portion, and they can thus provide an effective coolant feed in the direction of the cutting edges and in particular also improved chip discharge.

The cutting head can for example comprise the ceramic SiAlON which is described in various variants in WO 2006/1214777 A2. For uses like for example machining cast iron it is also alternatively possible to use SiN or the ceramic material employed can be reinforced by embedded whiskers.

In a variant the cutting head in the side view is of a substantially right-angled profile with rounded-off cutting corners (See FIGS. 3A and 3B). The radius of the cutting corners in that case can vary in the range of between 0.5 and 5 mm.

For making the butt connection between each other both the cutting head and also the connecting portion of the shank desirably each have a flat end face. Alternatively those faces could also be conical, that is to say formed by a conical projection or a conical recess.

In an embodiment the connection is made by means of hard solder which for making the connection between the cutting head and the connecting portion preferably involves a composition comprising at least 55% of silver, at least 25% of copper and at least 1% of titanium, wherein it is also possible to use a highest amount of 60 or 62% of silver, 30% of copper and 2% of titanium. The hard solder is moreover usually filled up to 100% with isopropanol, which leads to a doughy consistency which can be readily handled. The proportion can be for example between 6% and 19%. As is usual in the state of the art, the percentages in the composition of hard solder respectively refer to the weight of the components.

Such a hard solder of a composition in the specified range has proven to be extremely desirable and durable. In that case the hard solder can already have an integrated flux agent. Typically the cutting head is soldered on to ceramic in a furnace under vacuum, by a thin layer or a thin strip of the solder material being arranged between the mutually facing surfaces of the cutting head and the connecting portion and the entire milling cutter being heated in the furnace to between 700 and 800° C.

The butt connection between the cutting head and the connecting portion is admittedly effected in accordance with the foregoing embodiment by means of hard solder, but in an alternative embodiment it can also be made by an adhesive if it is possible in operation to ensure adequate cooling or to guarantee that there are no excessively high temperatures in the region of the join, which do not substantially adversely affect the adhesive connection. Such an adhesive join also additionally has a vibration-damping effect.

According to an embodiment the cutting head has at least one end cutting edge extending to the axis of rotation. That also permits in particular short axial feed or plunge movements of the tool.

The twist angle of the flutes of the cutting head and more precisely the main cutting edges of the cutting head can vary between 0° (parallel to the axis) and 50°. A variant has a twist angle of at least 35° and at most 45° to ensure advantageous chip transport.

In that respect the flutes are of an approximately triangular cross-section with a partially convex flute bottom. In accordance with an embodiment, the depth of the flutes decreases continuously starting from the tip of the milling cutter in the direction of the coupling portion. In that case, as already mentioned, the flutes extend continuously into the connecting portion of the shank.

Further advantages, features and possible uses of the present invention will be clearly apparent from the description hereinafter of a preferred embodiment and the Figures relating thereto, in which.

The drawings are views in principle which are admittedly close to the actual articles, but in that respect not all details have to be reproduced correctly and true to scale.

Figure 1:
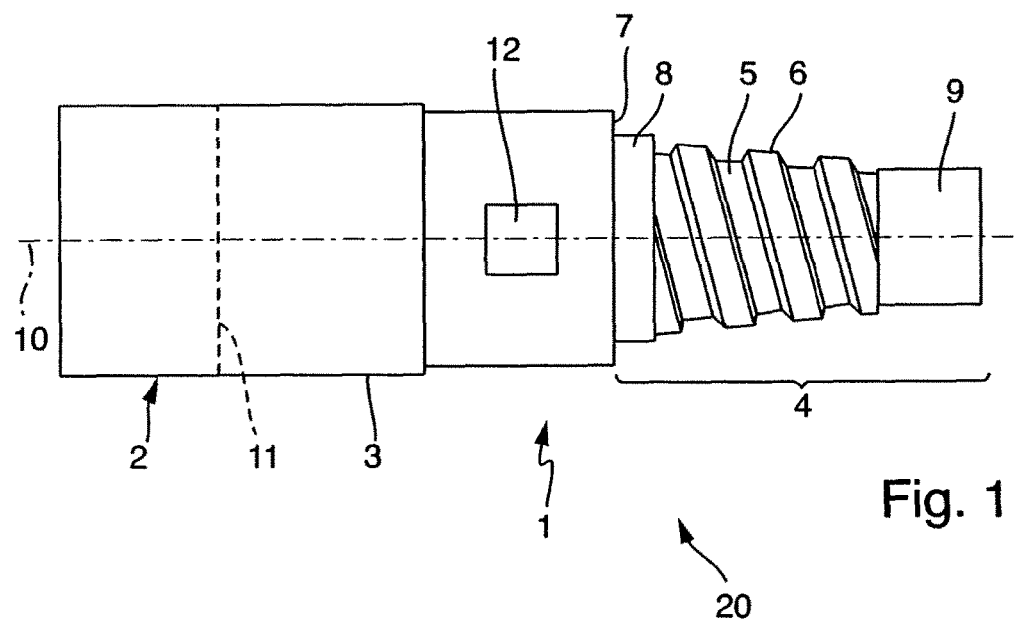
FIG. 1 shows a milling cutter according to the invention with a ceramic blank which is still unmachined but which is already soldered on to the connecting portion.

FIG. 1 shows an end milling cutter which is identified generally by 20 and which comprises a shank 1 and a cutting head 2, wherein the shank 1 in turn is divided into a connecting portion 3 and a coupling portion 4. The coupling portion 4 in turn comprises a conical peg 5 with a corresponding thread 6 which in its overall diameter tapers conically (referred to hereinafter as "conical thread"), a radial abutment surface 7 at the transition from the coupling portion 4 to the connecting portion 3 and a cylindrical or slightly conical guide surface 8 between the conical thread 6 and the abutment surface 7. The free end of the conical peg 5 can also be provided beyond the thread 6 with a further rear guide projection 9 which can also be cylindrical or slightly conical. In particular the guide projection 8 can have a precisely machined surface to ensure a close fit with a corresponding tool mounting so that in a condition of the end milling cutter which is clamped fast by means of the thread 6 in a tool mounting both the peripheral surface 8 bears in a close fit and preferably in an interference fit against a corresponding or cylindrical mounting surface of the tool mounting and at the same time the contact surface 7 bears against a corresponding radial abutment of the tool mounting.

The cutting head 2 comprises a solid ceramic part, preferably comprising the ceramic SiAlON, as disclosed for example in WO 2006/121477 A2. At its end towards the cutting head 2 the connecting portion 3 has a flat end face in the form of a circular disk, as also the cutting head 2 consisting of ceramic on the side 3 facing towards the connecting portion has a flat connecting surface in the form of a circular disk, which is exactly identical in its dimensions to the end face of the connecting portion 3. Consequently the two parts can be soldered together in flush relationship, wherein the solder surface or solder connection is indicated by a broken line 11 which coincides with the planes of the end faces, that bear against each other, of the cutting head 2 and the connecting portion 3.

In a specific embodiment a hard solder or a silver solder was used for making the connection, comprising 59% of silver, 27% of copper and 1.7% of titanium, wherein the remaining 12.3% comprises further elements or components like for example isopropanol and in particular can also include a flux agent.

Overall hard solders with between at least 55% and 60% (maximum 62%) of silver, between 25% and 30% of copper and 1% and 2% of titanium have proven to be advantageous for making the connection of ceramic with carbide metal.

In a preferred variant the shank 1 and in particular the connecting portion 3 in the illustrated embodiment comprise full carbide metal. Provided at the rear part of the connecting portion 3, on its otherwise cylindrical outside surface, there are also flat surfaces as tool engagement points 12, that is to say for applying a screw wrench and the like, in order to be able to clamp the milling cutter fast in a corresponding tool mounting by firmly tightening the thread 6 in a corresponding counterpart thread of the tool mounting.

In that respect the rear guide projection 9 facilitates insertion of the conical thread, in which respect a conical thread has the advantage that the first thread flights of the male thread 6 and of the corresponding female thread of the tool mounting can be moved axially past each other until the thread flights come into contact so that only a remaining rotation of for example between 1 and 1.5 turns is required for tightening the connection.

Between the conical thread 6 and the contact surface 7 the coupling portion 4 also has a cylindrical or slightly conical guide portion 8 whose cone angle, if present, is at any event markedly less than that of the conical peg 5 or the conical thread 6 respectively. The minimum diameter of that guide portion 8 is at least as large as the maximum diameter of the conical peg 5 and the conical thread 6. The contact surface 7 forming the transition to the connecting portion 3 extends perpendicularly to the axis 10 of the milling cutter. The guide portion 8 and the contact surface 7 are precisely machined so that they involve a very accurate fit with a corresponding seat of a tool mounting which has a corresponding cylindrical or conical surface and an annular flat abutment surface which is in opposite relationship to the surface 7. In the tightened condition the conical guide portion is preferably fitted with an interference fit in the corresponding mounting opening in the tool mounting while the contact surface 7 bears firmly against the abutment surface of the tool mounting.

Figure 2:
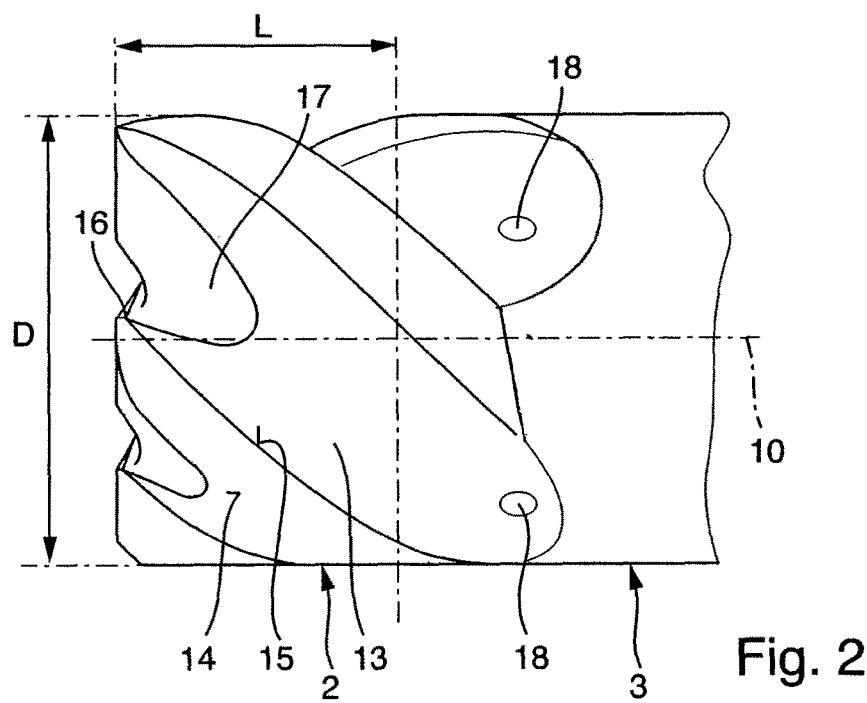
FIG. 2 shows a side view of the finished machined tool tip with the cutting head and a part of the connecting portion.
Figure 3B:
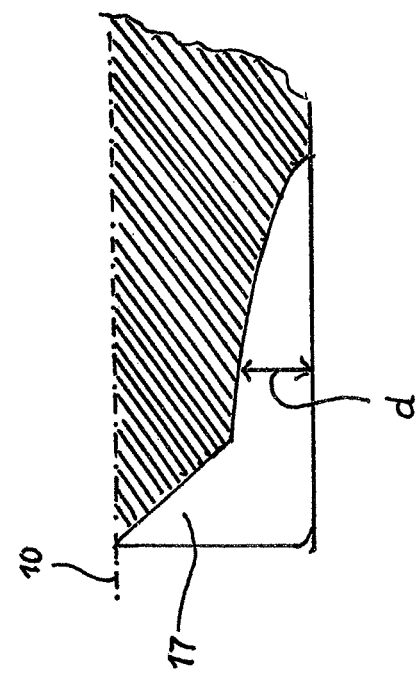
FIG. 3B shows the cross-section along section III-III of FIG. 3A.
Figure 3A:
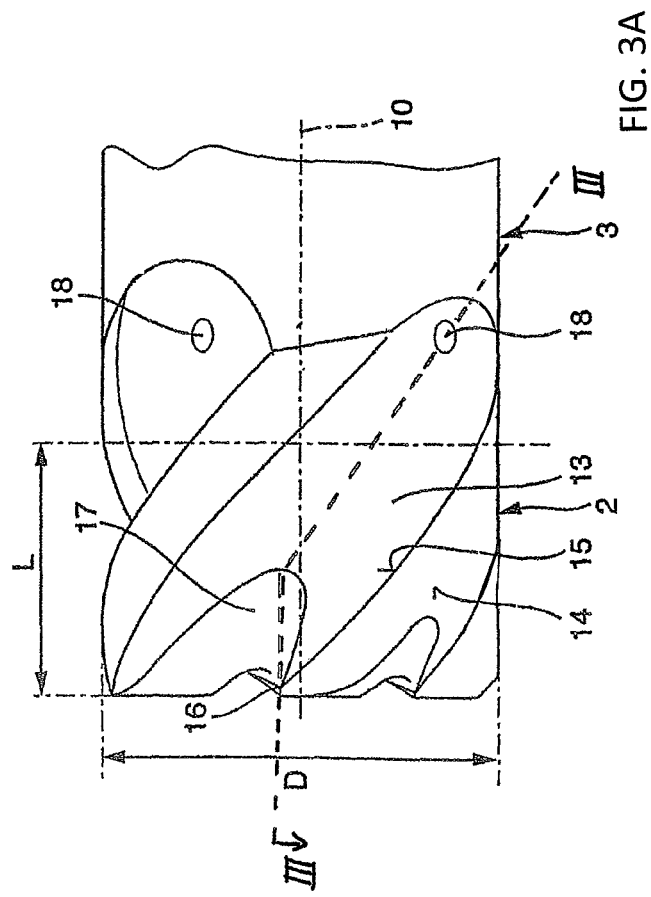
FIG. 3A shows the location of section III-III on the side view of FIG. 2

While FIG. 1 shows a side view of the milling cutter 20 in the rough condition, that is to say prior to the manufacture of corresponding cutting geometries, FIG. 2 shows the tip region of the milling cutter after finishing manufacture, wherein the cutting head 2 and only a broken-away part of the connecting portion 3 are shown in FIG. 2. In the illustrated embodiment the milling cutter has four flutes 13 and four main cutting edges 15 which are substantially identical, apart from a possible variation in the peripheral angular spacings of adjacent cutting edges both between various adjacent main and secondary cutting edges 15 and 16 and also along an adjacent pair of main cutting edges, which can also entail a corresponding variation in the width of the flutes 13.

As will be seen flutes 13 are now provided in the finished cutting head 2, extending into the connecting portion 3. Main cutting edges 15 are formed at the transition from the inside surface of the flutes 13 to corresponding round lands 14 which correspond to the original cylindrical peripheral surface of the cutting head 2 in FIG. 1. In addition the milling cutter has end secondary cutting edges 16 which are prolonged by web thinnings 7 in the direction of the axis of rotation 10, wherein the web thinnings 17 further narrow the core of the cutting head, that is otherwise defined by the bottom of the flutes 13, only in that outermost tip region. At least one of a plurality of web thinnings 17 provided along the periphery can in that case extend as far as the center, that is to say as far as the axis 10 of the milling cutter, so that at least one end cutting edge 16 is formed, which extends as far as the axis 10 of the milling cutter. It will be appreciated that a corresponding cutting head can have substantially any even or odd number of flutes 13 and cutting edges 15, in which respect depending on the respective size of the milling cutter there can typically be between three and twelve flutes 13 and cutting edges 15.

The cutting head 4 in the side view is of a substantially right-angled profile with rounded-off cutting corners. The radius of the cutting corners is here about 1 mm.

The ratio of the length L to the diameter D of the cutting head is in this case so selected that it is below 0.6, which imparts particular stability to the milling cutter or the solder connection 11 in regard to the length of the cutting edges 15 and the (short) maximum spacing of the cutting edges 15 or the end cutting edges 16 from the solder connection 11. At the same time the precise and very firm fit of the coupling portion 4 in a tool mounting ensures a very smooth and vibration-free operating movement of the milling cutter during a machining operation. Those features in particular in conjunction with each other provide that it is possible to implement machining with a lower degree of wear, with at the same time a high machining speed and a reduced risk of fracture.

The scope of protection of the invention is defined in detail by the claims.

For the purposes of the original disclosure it is pointed out that all features as can be seen by a man skilled in the art from the present description, the drawings and the appended claims, even if they are described in specific terms only in connection with certain further features, can be combined both individually and also in any combinations with others of the features or groups of features disclosed here insofar as that has not be expressly excluded or technical aspects make such combinations impossible or meaningless. A comprehensive explicit representation of all conceivable combinations of features and emphasis of the independence of the individual features from each other is dispensed with here only for the sake of brevity and readability of the description.

The invention claimed is:

1. An end milling cutter for heat-resistant superalloys (HRSA) comprising a shank and a cutting head, which have a common axis of rotation,
   wherein the shank is made of carbide metal and has a connecting portion for connection to the cutting head and a coupling portion for connection to a tool holder,
   wherein the cutting head comprises a solid ceramic part having a rotationally symmetrical envelope, which part is butt-connected to an end face of the connecting portion, and
   wherein the coupling portion has a conical peg with a male thread,
   wherein a hard solder is used for the butt connection between the cutting head and the connecting portion, and
   wherein the hard solder has composition comprising at least 55% and at most 60% of silver, at least 25% of and at most 30% of copper, and at least 1% and at most 2% of titanium.

2. The end milling cutter as set forth in claim 1, wherein a transition from the coupling portion to the shank is formed by a contact surface perpendicular to the axis of rotation.

3. The end milling cutter as set forth in claim 2, wherein the coupling portion between the contact surface and the thread on the conical peg has a rotationally symmetrical (cylindrical or conical) guide portion, and wherein a minimum radius of the guide portion between the contact surface and the thread on the conical peg is greater than a maximum radius of the conical thread.

4. The end milling cutter as set forth in claim 1, wherein the thread on the conical peg is of a part-cylindrical or trapezoidal cross-section.

5. The end milling cutter as set forth in claim 1, wherein a ratio of the axial length of the cutting head to its diameter is less than 1.

6. The end milling cutter as set forth in claim 1, wherein flutes ground into the cutting head are extended into the shank portion.

7. The end milling cutter as set forth in claim 1, wherein the cutting head comprises an SiAlON ceramic or SiN or a ceramic reinforced by whiskers.

8. The end milling cutter as set forth in claim 1, wherein in the side view the cutting head is of a substantially right-angled profile with rounded-off cutting corners.

9. The end milling cutter as set forth in claim 1, wherein the hard solder has an integrated flux agent.

10. The end milling cutter as set forth in claim 1, wherein an adhesive is used for the butt connection between the cutting head and the connecting portion.

11. The end milling cutter as set forth in claim 1, wherein the cutting head has at least one end cutting edge extending to the axis of rotation.

12. The end milling cutter as set forth in claim 1, wherein a twist angle of flutes of the cutting head is between 0 and 50°.

13. The end milling cutter as set forth in claim 6, wherein the depth of the flutes continuously decreases from a tip of the milling cutter towards the shank.

14. The end milling cutter as set forth in claim 1, wherein, in a region of the milling cutter end, additional web thinning is ground into a bottom of flutes or a milling cutter core.

15. The end milling cutter as set forth in claim 1, wherein provided in the shank is at least one coolant bore which opens in a portion of at least one flute, that extends into the connecting portion.

16. The end milling cutter as set forth in claim 5, wherein the ratio of the axial length of the cutting head to its diameter is less than 0.5.

17. The end milling cutter as set forth in claim 12, wherein the twist angle of the flutes of the cutting head is at least 35° and at most 45°.

* * * * *